United States Patent
Han

(10) Patent No.: US 9,832,400 B2
(45) Date of Patent: Nov. 28, 2017

(54) IMAGE SENSOR AND METHOD OF SENSING IMAGE

(71) Applicant: Dongbu HiTek, Co. Ltd., Bucheon-si (KR)

(72) Inventor: Yong In Han, Cupertino, CA (US)

(73) Assignee: Dongbu HiTek Co., Ltd., Bucheon-si (KR)

(\*) Notice: Subject to any disclaimer, the term of this patent is extended or adjusted under 35 U.S.C. 154(b) by 0 days.

(21) Appl. No.: 15/291,399

(22) Filed: Oct. 12, 2016

(65) Prior Publication Data

US 2017/0295330 A1    Oct. 12, 2017

(30) Foreign Application Priority Data

Apr. 8, 2016  (KR) .......................... 10-2016-0043422

(51) Int. Cl.
| | |
|---|---|
| *H04N 5/361* | (2011.01) |
| *H04N 5/363* | (2011.01) |
| *H04N 5/369* | (2011.01) |
| *H04N 5/365* | (2011.01) |

(52) U.S. Cl.
CPC .......... *H04N 5/361* (2013.01); *H04N 5/363* (2013.01); *H04N 5/3658* (2013.01); *H04N 5/3696* (2013.01)

(58) Field of Classification Search
CPC ................ H04N 5/2176; H04N 5/357–5/3675
See application file for complete search history.

(56) References Cited

U.S. PATENT DOCUMENTS

| | | | |
|---|---|---|---|
| 8,451,350 B2* | 5/2013 | Nozaki .................. | H04N 5/361 348/243 |
| 2008/0012966 A1* | 1/2008 | Beck ...................... | H04N 5/361 348/245 |
| 2012/0212657 A1* | 8/2012 | Mo ........................ | H04N 5/378 348/300 |

\* cited by examiner

*Primary Examiner* — Nhan T Tran
*Assistant Examiner* — Chriss Yoder, III
(74) *Attorney, Agent, or Firm* — Andrew D. Fortney; Central California IP Group, P.C.

(57) ABSTRACT

An image sensor includes a pixel array unit including an active pixel area including active pixels, a first dark area including first dark pixels, and a second dark area including second dark pixels, an offset extractor configured to extract a final dark offset value, and a corrector configured to correct pixel data values of the active pixels based on the final dark offset value. The offset extractor extracts a per-column dark offset value, a global dark offset value, a per-row average, and a per-row noise value, selects one of the extracted per-column dark offset value and global dark offset value, and extracts the final dark offset value from the per-row noise value and either the per-column dark offset value or the global dark offset value.

20 Claims, 9 Drawing Sheets

FIG. 6A

| $DC_1$ | $DC_2$ | | $DC_m$ |
|---|---|---|---|
| $DP_{11}$ | | | $DP_{1m}$ |
| | | | |
| ⋮ | | ⋯ | |
| $DP_{n1}$ | | | $DP_{nm}$ |

IMAGE SENSOR AND METHOD OF SENSING IMAGE

This application claims the benefit of Korean Patent Application No. 10-2016-0043422, filed on Apr. 8, 2016, which is hereby incorporated by reference as if fully set forth herein.

BACKGROUND OF THE INVENTION

Field of the Invention

Embodiments of the present invention relate to an image sensor and a method of sensing an image.

Discussion of the Related Art

An image sensor is a semiconductor device that converts an optical image into an electrical signal and has been used for a digital camera, a mobile communication terminal, etc. Such an image sensor may include a plurality of unit pixels.

As the number of pixels of an image sensor increases and the size of the image sensor decreases, the size of the pixel decreases and thus influence of dark current, noise generated by the dark current, photon shot noise and/or MOS device noise increases.

In a CMOS type image sensor, characteristics of an active device (for example, a deviation of a threshold voltage Vth) may appear in an image signal. The deviation may have a fixed value with respect to each pixel, and may cause fixed pattern noise (FPN) on the image displayed on the screen. In particular, as the distance between adjacent pixels decreases, an abnormal output image may be generated due to column fixed pattern noise (CFPN) that is generated due to an offset of the pixels or of a processing circuit in one or more (e.g., each) column upon implementing an image.

SUMMARY OF THE INVENTION

Accordingly, embodiments of the present invention are directed to an image sensor capable of simultaneously cancelling column fixed pattern noise and row noise, reducing or preventing image quality deterioration, and/or reducing or preventing recognition rate performance deterioration.

Additional advantages, objects, and features of the invention will be set forth in part in the description which follows and in part will become apparent to those skilled in the art upon examination of the following or may be learned from practice of the invention. The objectives and other advantages of the invention may be realized and attained by the structures particularly pointed out in the written description and claims hereof as well as the appended drawings.

To achieve these objects and other advantages and in accordance with the purpose(s) of embodiments of the invention, as embodied and broadly described herein, an image sensor may include a pixel array including an active pixel area including active pixels, a first dark area at one or more sides of the active pixel area in a column direction and including first dark pixels, and a second dark area at one or more sides of the active pixel area in a row direction and including second dark pixels, an offset extractor configured to extract a final dark offset value, and a corrector configured to correct pixel data values of the active pixels based on the final dark offset value, wherein the offset extractor extracts a per-column dark offset value, a global dark offset value, a per-row average and a per-row noise value, selects one of the per-column dark offset value and the global dark offset value, and extracts the final dark offset value from the selected one of the per-column dark offset value and the global dark offset value and the per-row noise value (e.g., by adding the per-column dark offset value or the global dark offset value to the per-row noise value). The per-column dark offset value may be a per-column average of the first dark pixels in each column of the first dark area, and the global dark offset value may be an average of all of the first dark pixels. The per-row average may be a per-row average of the second dark pixels in each row of the second dark area, and the per-row noise value may be obtained by subtracting the global dark offset value from the per-row average.

The offset extractor may include a first offset extractor configured to extract the per-column dark offset value and the global dark offset value and select and output one of the per-column dark offset value and the global dark offset value, a second offset extractor configured to extract the per-row average then extract the per-row noise value from the global dark offset value and the extracted per-row average (e.g., by subtracting the global dark offset value from the extracted per-row average), and a calculator configured to extract the final dark offset value from the output of the first offset extractor and the per-row noise value (e.g., by adding the output of the first offset extractor and the per-row noise value).

The first offset extractor may include a first average extractor configured to extract and output an average of the first dark pixels in each column of the first dark area as the per-column dark offset value, a second average extractor configured to extract and output an average of all of the first dark pixels in the first dark area as the global dark offset value, and a selector configured to select and output one of the per-column dark offset value and the global dark offset value.

The first offset extractor may further include a first filter configured to remove one or more predetermined outliers from the first dark pixels and provide the first dark pixels from which the predetermined outlier(s) are removed to the first and second average extractors.

The first average extractor may extract the per-column dark offset value (e.g., by weight-averaging the first dark pixels in each column).

The first average extractor may extract a weighted average of the first dark pixels of a (k−1)-th (k being a natural number greater than 1 and less than n) row in each column and a weighted average of the first dark pixels of a k-th row (e.g., by weight-averaging the first dark pixels of the k-th row).

The weighted average of the first dark pixels of the first row may be the weighted average of the first dark pixels of the last row of each column.

A larger weighted value may be given to the weighted average of the first dark pixels of the (k−1)-th (k being a natural number greater than 1 and less than n) row, as compared to the first dark pixels of the k-th row.

The first average extractor may further include a memory configured to store the weighted average of the first dark pixels of the (k−1)-th (k being a natural number greater than 1 and less than n) row in each column.

The second offset extractor may include a third average extractor configured to extract an average of the second dark pixels in each row of the second dark area and output the per-row average, and a subtractor configured to output the per-row noise value from the global dark offset value and the per-row average (e.g., by subtracting the global dark offset value from the per-row average).

The second offset extractor may further include a second filter configured to filter the second dark pixels in each row of the second dark area and provide a filtered output (e.g., a median second dark pixel value) to the third average extractor.

The corrector may output corrected pixel data values (e.g., by subtracting the final dark offset value from the pixel data values of the active pixels).

According to another aspect, an image sensor includes a pixel array including an active pixel area including active pixels, a first dark area at one or more sides of the active pixel area in a column direction and including first dark pixels, and a second dark area at one or more sides of the active pixel area in a row direction and including second dark pixels, a first average extractor configured to remove one or more predetermined outliers from outputs of the first dark pixels and output a per-column dark offset value extracting an average of the first dark pixels in each column of the first dark area from which the predetermined outlier(s) are removed, a second average extractor configured to output a global dark offset value extracting an average of all of the first dark pixels in the first dark area from which the predetermined outlier(s) are removed, a selector configured to select and output one of the per-column dark offset value and the global dark offset value, a row offset extractor configured to extract a per-row average of the second dark pixels in each row of the second dark area and output a per-row noise value (e.g., by subtracting the global dark offset value from the per-row average, a calculator configured to extract a final dark offset value (e.g., by adding an output of the selector to the per-row noise value, and a corrector configured to output corrected pixel data values (e.g., by subtracting the final dark offset value from the pixel data values of the active pixels).

According to another aspect of the invention, a method of sensing an image sensor including a pixel array including an active pixel area including active pixels, a first dark area at one or more sides of the active pixel area in a column direction and including first dark pixels, and a second dark area at one or more sides of the active pixel area in a row direction and including second dark pixels includes extracting an average of the first dark pixels in each column of the first dark area (e.g., by driving the first dark pixels and acquiring a per-column dark offset value), extracting an average of all of the first dark pixels and acquiring a global dark offset value, selecting one of the per-column dark offset value and the global dark offset value (e.g., based on one or more predetermined operational conditions), acquiring a per-row average (e.g., by extracting an average of the second dark pixels in each row of the second dark area after driving the second dark pixels), extracting per-row noise from the global dark offset value and the per-row average (e.g., by subtracting the global dark offset value from the per-row average), acquiring a final dark offset value from the per-row noise value and the selected per-column dark offset value or global dark offset value (e.g., by adding the selected one of the per-column dark offset value and the global dark offset value to the per-row noise value, optionally based on the predetermined operational condition[s]), and correcting pixel data from the active pixels based on the final dark offset value.

The sensing method may further include removing one or more predetermined outliers from the first dark pixels before acquiring the per-column dark offset value and acquiring the global dark offset value, and the per-column dark offset value and the global dark offset value may be acquired based on the first dark pixels from which the predetermined outlier(s) are removed.

Acquiring the per-column dark offset value may include extracting the per-column dark offset value (e.g., by weight-averaging the first dark pixels in each column of the first dark area).

Acquiring the per-column dark offset value may include extracting a weighted average of the first dark pixels of a (k−1)-th (k being a natural number greater than 1 and less than n) row in each column and a weighted average of the first dark pixels of a k-th row (e.g., by weight-averaging the first dark pixels of the k-th row).

The method may further include filtering the second dark pixels in each row of the second dark area (e.g., to provide a median second dark pixel value), and acquiring the per-row average using the filtered output(s).

According to embodiments of the present invention, it is possible to simultaneously cancel column fixed pattern noise and row noise, reduce or prevent image quality deterioration and reduce or prevent recognition rate performance deterioration.

According to embodiments of the present invention, by acquiring and/or extracting the final dark offset value according to an operational condition such as a temperature or luminance of the surrounding environment (e.g., upon meeting or crossing a threshold temperature and/or a threshold luminance), it is possible to reduce power consumption, increase the accuracy of correction of active raw data values of or from the active pixel area, and reduce or cancel noise in the image sensor.

It is to be understood that both the foregoing general description and the following detailed description of embodiments of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle(s) of the invention. In the drawings:

FIGS. 6A to 6D are diagrams showing various embodiments of a method of extracting an average in a first average extractor;

DETAILED DESCRIPTION OF THE INVENTION

Figure 1:
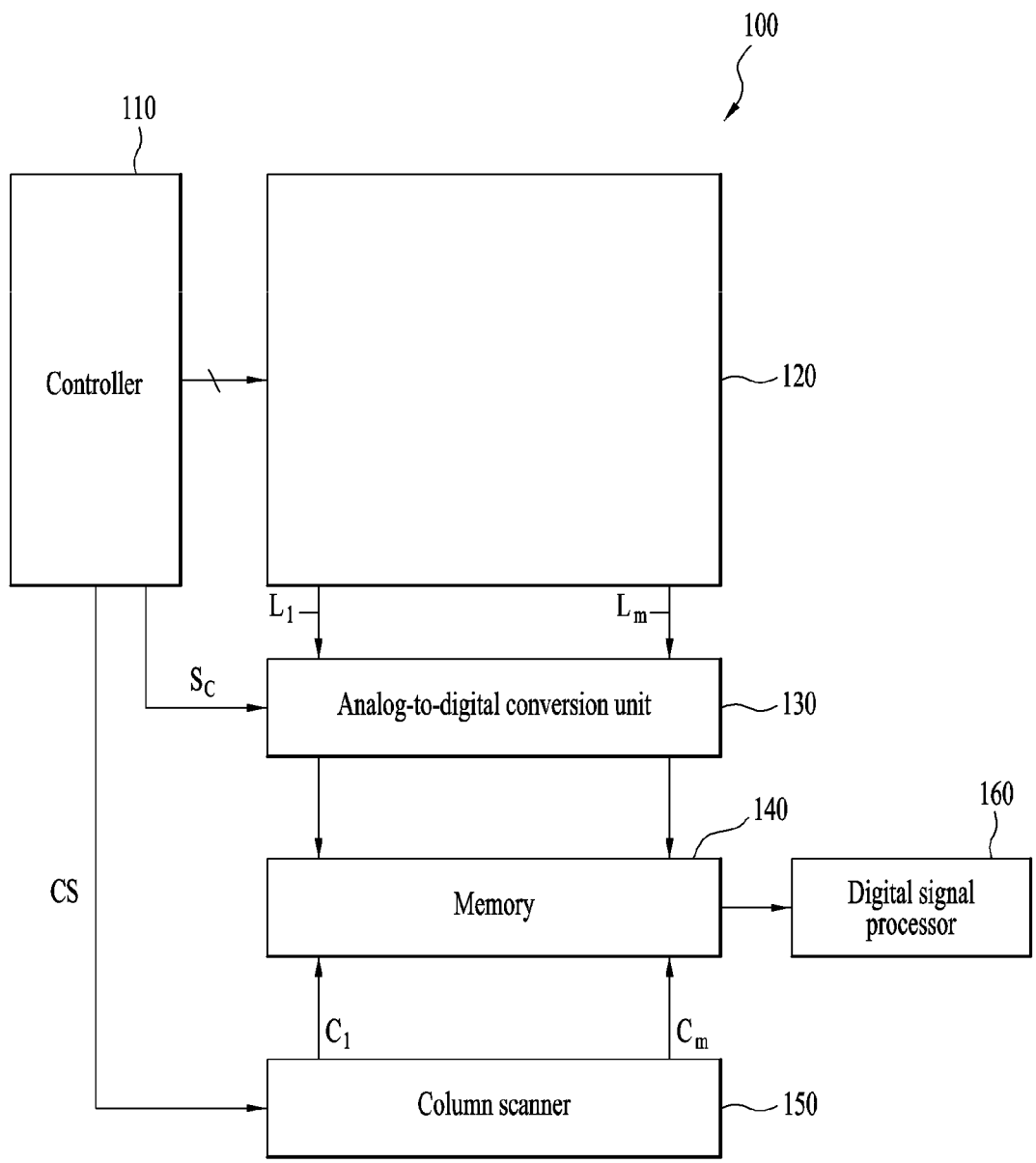
FIG. 1 is a diagram showing the configuration of an image sensor according to one or more embodiments of the present invention.

Hereinafter, embodiments of the present invention will be clearly appreciated through the accompanying drawings and the following description thereof. In description of the embodiments, it will be understood that, when an element such as a layer, film, region, pattern or structure is referred to as being formed "on" or "under" another element, such as a substrate, layer, film, region, pad or pattern, it can be directly "on" or "under" the other element or be indirectly "on" or "under" the other element with intervening elements therebetween. It will also be understood that "on" and "under" the element is described relative to the drawings. In addition, the same reference numerals designate the same constituent elements throughout the description of the drawings.

FIG. 1 is a diagram showing the configuration of an image sensor 100 according to one or more embodiments of the present invention.

Referring to FIG. 1, the image sensor 100 includes a controller 110, a pixel array 120, an analog-to-digital conversion unit 130, a memory 140 and a column scanner 150.

The controller 110 outputs a first control signal $S_d$ configured to control the pixel array 120, a second control signal $S_c$ configured to control the analog-to-digital conversion unit, and a third control signal CS configured to control the column scanner 170.

For example, the first control signal $S_d$ may include a reset signal RX, a transmission signal TX and a select signal SX configured to control reset, transmit and pixel select operations of the pixels of the pixel array 120.

The controller 110 may include a timing controller configured to generate a timing signal or a control signal and a row driver configured to generate the first control signal $S_d$ that may drive a plurality of unit pixels based on the timing signal from the timing controller, without being limited thereto, and which may be implemented in various manners capable of driving the plurality of unit pixels of the pixel array 120.

For example, the row driver may generate the drive signal $S_d$ for driving the pixel array 120 and output the generated drive signal to the pixel array 120.

For example, the row driver may output the drive signal $S_d$ to drive an active pixel area 205 (see FIGS. 2-3), a first dark area 212 (FIG. 2) or 212a and 212b (FIG. 3) and a second dark area 222 (FIG. 2) or 222a and 222b (FIG. 3) of the pixel array 120.

The pixel array 120 may include a plurality of unit pixels, and the plurality of unit pixels may be in a matrix including rows and columns. Each unit pixel may be a photoelectric transformation element configured to sense light and transform the sensed light into an electrical signal.

The pixel array 120 may include sensing lines L1 to Lm (m being a natural number greater than 1) connected to the unit pixels and configured to output sensing signals a1 to am (m being a natural number greater than 1). For example, each of the sensing lines L1 to Lm may be connected to output terminals of the unit pixels.

The pixel array 120 may include an active pixel area, a first dark area (black area) at one or more sides of the active pixel area in a first (e.g., column) direction and a second dark area at one or more sides of the active pixel area in a second (e.g., row) direction orthogonal to the first direction.

The analog-to-digital conversion unit 130 converts the analog sense signals from the pixel array 120 on the sensing lines L1 to Lm into digital signals.

The analog-to-digital conversion unit 130 may also perform correlated double sampling (CDS). In one example, CDS may refer to a difference between first and second digital data, where the first digital data is a digital signal obtained by converting a first sense signal from a unit pixel upon resetting the unit pixel, and the second digital data is a digital signal that may be obtained by converting a second sense signal from the unit pixel corresponding to an external image signal.

For example, the analog-to-digital conversion unit 130 may include a CDS processor configured to perform CDS and an analog-to-digital converter configured to convert an output of the CDS processor into a digital signal.

For example, although the CDS processor may include a switch, a capacitor and a differential amplifier, embodiments of the present invention are not limited thereto and may be variously implemented.

Furthermore, although the analog-to-digital converter may include a ramp signal generator, a comparator and a counter, embodiments of the present invention are not limited thereto and may be variously implemented.

The memory 140 may store outputs of the analog-to-digital conversion unit 130 and transmit the stored outputs of the analog-to-digital conversion unit 130 to a digital signal processor 160 in response to control signals $C_1$ to $C_m$ of the column scanner 150.

For example, the memory 140 may include a plurality of latches or a plurality of capacitors (e.g., one transistor-one capacitor random access memory cells such as are typically found in dynamic random access memories).

The column scanner 150 may output the control signals $C_1$ to $C_m$ to control the memory 140 based on the control signal CS received from the controller 110. The outputs of the analog-to-digital conversion unit 130 stored in the memory 140 may be sequentially read and transmitted to the digital signal processor 160 by the first control signals $C_1$ to $C_m$ from the column scanner 150.

The digital signal processor 160 performs processes the digital signals from the memory 140.

Although the digital signal processor 160 as shown is independent of the controller 110 in FIG. 1, embodiments of the present invention are not limited thereto. In other embodiments, the controller 110 may control and/or include the digital signal processor 160.

Figure 2:
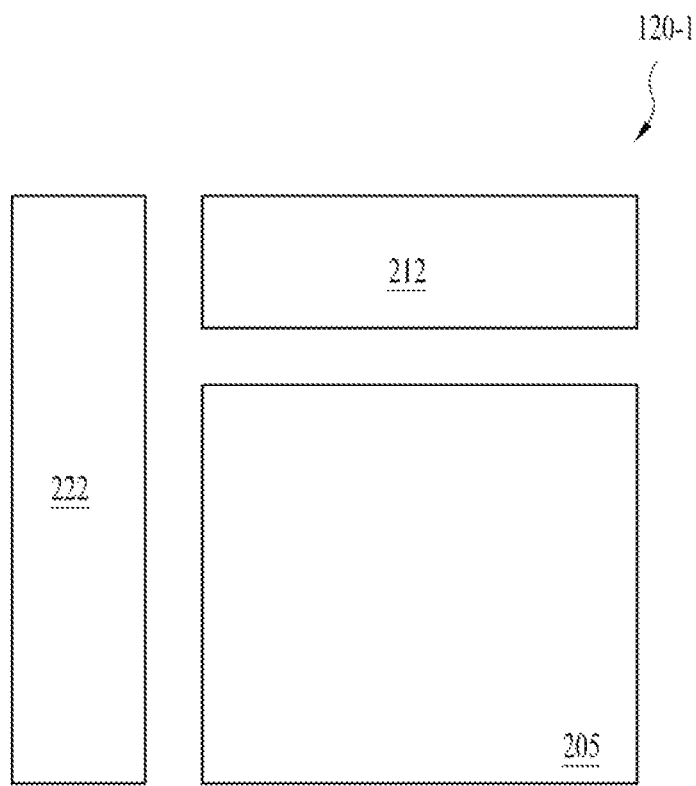
FIG. 2 is a diagram showing an embodiment of the pixel array shown in FIG. 1.

FIG. 2 is a diagram showing an embodiment 120-1 of the pixel array 120 shown in FIG. 1.

Referring to FIG. 2, the pixel array 120-1 includes an active pixel area 205, a first dark area 212 and a second dark area 222.

Although the first dark area 212 may be spaced apart from the active pixel area 205 and located adjacent to the active pixel area 205, embodiments of the present invention are not limited thereto. In another embodiment, the first dark area 212 may be spaced apart from the active pixel area 205 and located on an opposite side of the active pixel area 205.

Although the second dark area 222 may be spaced apart from the active pixel area 205 and located at one side of the active pixel area 205, embodiments of the present invention are not limited thereto. In another embodiment, the second dark area 222 may be spaced apart from the active pixel area 205 and located at an opposite side of the active pixel area 205.

The active pixel area 205 may include a plurality of first pixels configured to convert incident light into an electrical signal using the photoelectric conversion properties of a photoreceptor (e.g., a photodiode). The plurality of pixels (hereinafter, referred to as "active pixels") may be arranged in a matrix.

The first and second dark areas 212 and 222 may be areas in which incident light is blocked. For example, each of the first and second dark areas 212 and 222 may be areas in which incident light is shielded by a metal layer or a reflective film.

For example, the first dark area 212 may include a plurality of pixels (hereinafter, referred to as "first dark pixels"), and the plurality of first dark pixels may be arranged in a matrix. In addition, the second dark area 222 may include a plurality of pixels (hereinafter, referred to as "second dark pixels"), and the plurality of second dark pixels may be arranged in a matrix.

Each column of the first dark area 212 may correspond to or be aligned with a corresponding one of the columns of the active pixel area 205. Each row of the second dark area 222 may correspond to or be aligned with a corresponding one of the rows of the first dark area 212 and the active pixel area 205.

In another embodiment, each row of the second dark area may be aligned with a corresponding one of the rows of the active pixel area, and each column of the first dark area may be aligned with a corresponding one of the columns of the active pixel area and the second dark area.

Figure 3:
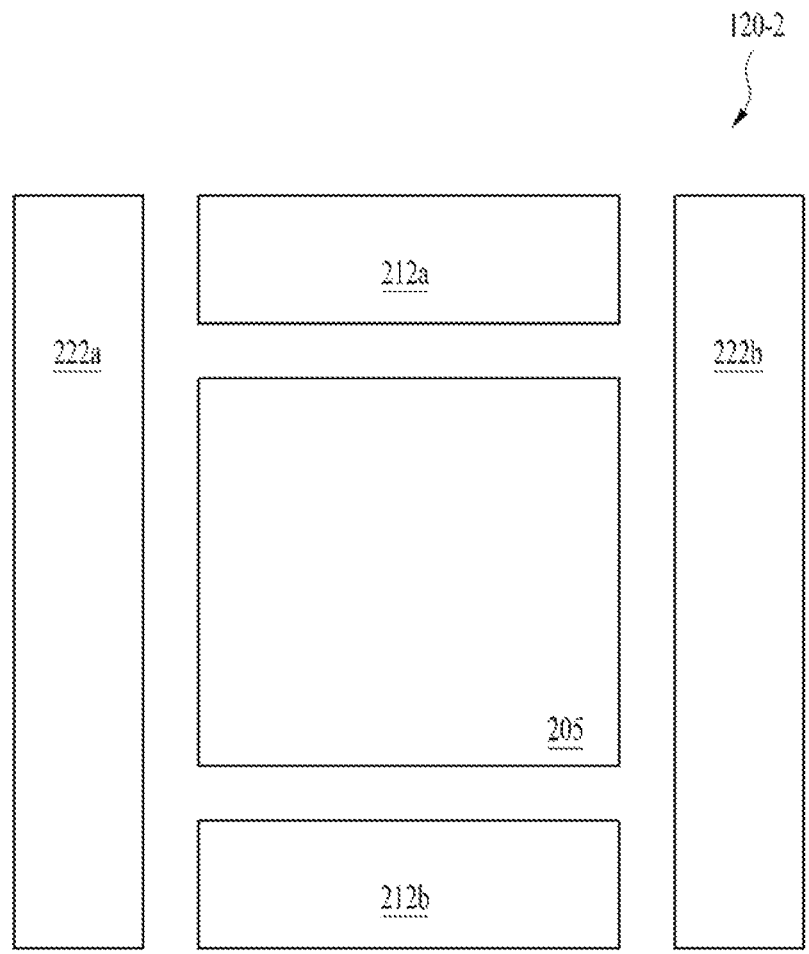
FIG. 3 is a diagram showing another embodiment of the pixel array shown in FIG. 1.

FIG. 3 is a diagram showing another embodiment 120-2 of the pixel array 120 shown in FIG. 1.

Referring to FIG. 3, the pixel array 120-2 includes an active pixel area 205, first dark areas 212a and 212b on first and third sides of (e.g., above and below) the active pixel area 205 and second dark areas 222a and 222b on second and fourth sides (e.g., at the left and right sides) of the active pixel area 205.

The first dark areas 212a and 212b and the second dark areas 222a and 222b may be spaced apart from the active pixel area 205 and may block incident light.

Each of the first dark areas 212a and 212b may include a plurality of first dark pixels that may be arranged in a matrix.

Each of the second dark areas 222a and 222b may include a plurality of second dark pixels that may be arranged in a matrix.

For example, each column of the first dark areas 212a and 212b may be aligned with a corresponding one of the columns of the active pixel area 205. In addition, each row of the second dark areas 222a and 222b may be aligned with a corresponding one of the rows of the active pixel area 205 and the first dark areas 212a and 212b.

Furthermore, in another embodiment, each row of the second dark areas 222a and 222b may be aligned with a corresponding one of the rows of the active pixel area 205. In addition, each column of the first dark areas 212a and 212b may be aligned with a corresponding one of the columns of the active pixel area 205 and the second dark areas 222a and 222b.

Figure 4:
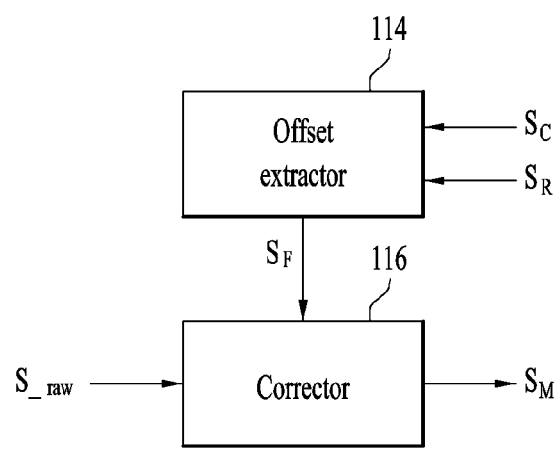
FIG. 4 is a diagram showing the configuration of one or more embodiments of the controller shown in FIG. 1.

FIG. 4 is a diagram showing an exemplary configuration of one or more embodiments of the digital signal processor 160 shown in FIG. 1.

Referring to FIG. 4, the digital signal processor 160 may include an offset extractor 114 and a corrector 116.

The offset extractor 114 may extract a final offset value $S_F$ configured to compensate for a dark level based on a first output $S_C$ of the first dark area 212 (or the first areas 212a and 212b) and a second output $S_R$ of the second dark area 222 (or the second dark areas 222a and 222b).

The offset extractor 114 may extract pixel data values (hereinafter, referred to as "dark pixel data values") of the first and second dark areas and extract the final offset value $S_F$ configured to compensate for the dark level(s) using the extracted dark pixel data values, in order to extract an offset configured to cancel noise due to the dark current of the pixel array 120. The dark current is generated regardless of the presence, absence or value(s) of an optical image.

The offset extractor 114 extracts a per-column dark offset value, a global dark offset value, a per-row average, and a per-row noise value, selects one of the extracted per-column dark offset value and the extracted global dark offset value, and extracts the final dark offset value from the per-row noise value and either the per-column dark offset value or the global dark offset value, depending on whether the per-column dark offset value or the global dark offset value is selected. For example, the final dark offset value may be extracted by adding the selected per-column dark offset value or global dark offset value to the per-row noise value.

The corrector 116 corrects the raw data values $S\_raw$ (hereinafter, referred to as "active raw data values") of the active pixel area 205 based on or using the dark pixel data value, and extracts the active pixel data values without noise $S_M$ (hereinafter, referred to as a "corrected pixel data values"). Here, the dark pixel data values may be data values obtained by converting the analog outputs of the first and second dark areas using the analog-to-digital conversion unit 130, and the active raw data values may be values obtained by converting the analog outputs of the active pixel area 205 using the analog-to-digital conversion unit 130.

Figure 5:
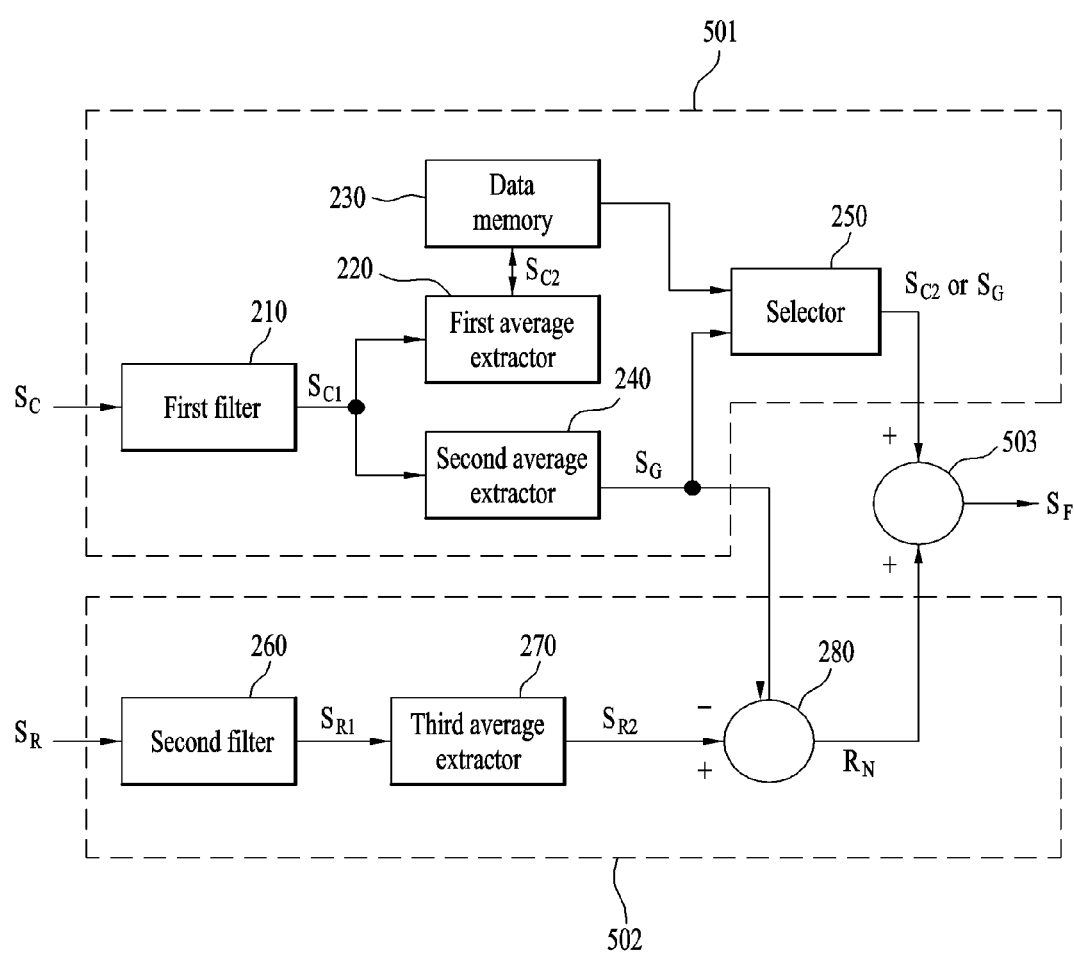
FIG. 5 is a diagram showing one or more embodiments of the offset extractor shown in FIG. 4.

FIG. 5 is a diagram showing one or more embodiments of the offset extractor shown in FIG. 4.

Referring to FIG. 5, the offset extractor 114 may include a first offset extractor 501, a second offset extractor 502, and a calculator (e.g., subtractor) 503.

The first offset extractor 501 may extract the per-column dark offset value and the global dark offset value from or based on the first output $S_C$ of the first dark area 212 (or the outputs of the first dark areas 212a and 212b) and select and output one of the per-column dark offset value and the global dark offset value.

The first offset extractor 501 may include a first filter 210, a first average extractor 220, a memory 230, a second average extractor 240 and a selector 250.

The first filter 210 may filter the output $S_C$ of the first dark pixels of the first dark area 212 (or the first dark areas 212a and 212b), remove an outlier from the output $S_C$ of the first dark pixels, and output filtered first dark pixels $S_{C1}$ (e.g., the first dark pixels with the outlier removed).

The first dark area 212 (or the first dark areas 212a and 212b) may include a first dark pixel having a defect, and thus may generate an abnormal output or an outlier due to the defect. For example, the first dark area 212 (or the first dark areas 212a and 212b) may include a first dark pixel having an abnormally large output value due to a defect (e.g., a white defect) or a first dark pixel having an abnormally small output value due to a defect (e.g., a black defect). Such a defect may be generated in the semiconductor manufacturing process.

Here, the outlier may be a value outside a predetermined range, where the predetermined range has a lower limit and an upper limit. For example, the first filter 210 may remove a value of a first dark pixel that is less than the lower limit and/or a value of the first dark pixel that is greater than the upper limit from the output $S_C$ of the first dark pixels.

The first filter 210 is responsible for removing abnormal outputs (e.g., outliers) of the first dark area 212 (or the first dark areas 212a and 212b) that may be due to a defect. The first filter 210 may comprise or be implemented by an outlier removal filter. By removing the outputs of defective pixels, it is possible to improve dark level compensation accuracy. In other embodiments, the first filter 210 may be omitted.

The first average extractor 220 extracts an average $S_{C2}$ of the first dark pixels of each column of the first dark area 212 (or the first dark areas 212a and 212b) using the output $S_{C1}$ of the first filter 210. The memory 230 may store the extracted average $S_{C2}$. If the first filter 210 is omitted, the average $S_{C2}$ of the first dark pixels of each column may be extracted from the first dark pixels. Hereinafter, the average $S_{C2}$ of the first dark pixels of each column may be referred to as a "per-column dark offset value".

The first average extractor 220 may extract the per-column dark offset value of the first dark pixels in each column of the first dark area 212 (or the first dark areas 212a and 212b). In one example, the per-column dark offset value is extracted by weight-averaging the first dark pixels in each column of the first dark area(s).

The first average extractor 220 may extract a weighted average of the first dark pixels of a (k−1)-th (k being a natural number greater than 1 and less than n) row in each column of the first dark area 212 (or the first dark areas 212a and 212b) and a weighted average of the first dark pixels of a k-th row (e.g., by weight-averaging the first dark pixels of the k-th row).

When the weighted average of the first dark pixels of the k-th row is extracted, a larger weighted value may be given to the weighted average of the first dark pixels of the (k−1)-th (k being a natural number greater than 1 and less than n) row than the first dark pixels of the k-th row.

The weighted average of the first dark pixels of the first row of each column of the first dark area 212 (or the first dark areas 212a and 212b) of a current frame may be a weighted average of the first dark pixel of the last row of each column of a previous frame.

The memory 230 may store the weighted average of the first dark pixels of the (k−1)-th (k being a natural number greater than 1 and less than n) row in each column.

FIGS. 6A to 6D are diagrams showing various embodiments of a method of extracting the average $S_{C2}$ of the first dark pixels using the first average extractor 220.

Referring to FIG. 6A, the first average extractor 220 extracts per-column averages $P_{11}$ to $P_{1m}$ of the first dark pixels $DP_{11}$ to $DP_{nm}$ (n and m independently being natural numbers greater than 1, and in various embodiments, up to 2, 4, 8, 16, etc. [e.g., $2^x$, where x is a natural number≥1]) in each of columns $DC_1$ to $DC_m$ (m being a natural number greater than 1, and in one embodiment, equal to the number of columns in the active pixel area) of a first frame of the first dark area 212 (or the first dark areas 212a and 212b) and stores the extracted per-column averages P11 to P1m in the memory 230.

Referring to FIG. 6B, the first average extractor 220 may weight-averages the outputs $S_{11}$ to $S_{1m}$ of the first dark pixels in the first row DR1 of a second frame of the first dark area 212 (or the first dark areas 212a and 212b) and the per-column averages $P_{11}$ to $P_{1m}$ extracted from the first frame and stored in the memory 230). Weight-averaging the outputs $S_{11}$ to $S_{1m}$ and the per-column averages $P_{11}$ to $P_{1m}$ extracts the per-column weighted averages $P_{21}$ to $P_{2m}$ of the first row DR1. The first average extractor 220 stores the extracted per-column weighted averages $P_{21}$ to $P_{2m}$ of the first row DR1 in the memory 230. Weight-averaging the outputs $S_{11}$ to $S_{1m}$ and the per-column averages $P_{11}$ to $P_{1m}$ may comprise applying a weight to the outputs $S_{11}$ to $S_{1m}$ of the second frame and/or the per-column averages $P_{11}$ to $P_{1m}$ of the first frame. The weight may be applied by multiplication and/or addition, or conversely, by division and/or subtraction. In the case of multiplication, the weight may have a value of 0 or more (e.g., from 0 to 2, from 1 to 2, etc.), and in the case of addition, the weight may have a value of 0 or more (e.g., from 0 to 1, etc.). The weight applied to each first dark per-column average may have the same value or different values, and may be stored in the memory 230 or in a different memory.

The first average extractor 220 may store the per-column weighted averages $P_{21}$ to $P_{2m}$ of the first row DR1 of the second frame may be stored in the memory 230 in addition to each of the per-column averages $P_{11}$ to $P_{1m}$ or by overwriting the per-column averages $P_{11}$ to $P_{1m}$, thereby performing an update.

For example, a larger weighted value may be given to the extracted per-column averages $P_{11}$ to $P_{1m}$ of the first frame as compared to the outputs $S_{11}$ to $S_{1m}$ of the first dark pixels $DP_{11}$ to $DP_{nm}$ of the first row DR1 of the second frame during weighted averaging, or vice versa, although the invention is not limited thereto.

Figure 6C:
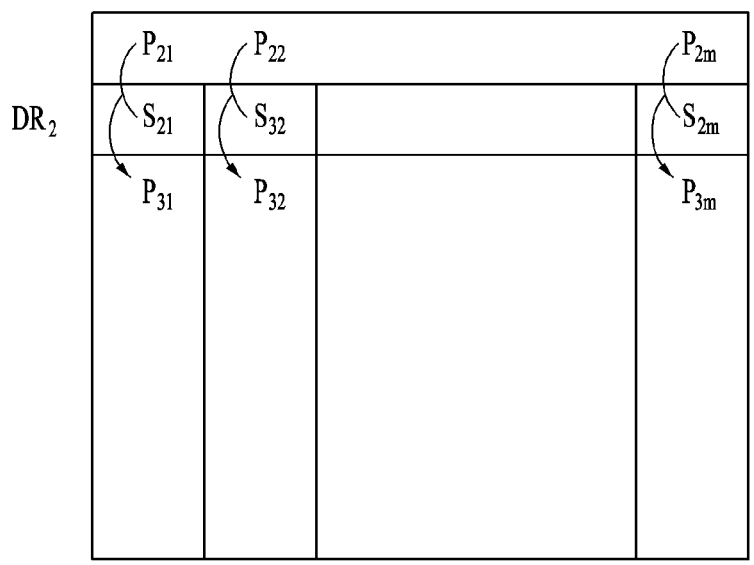

Referring to FIG. 6C, the first average extractor 220 weight-averages the outputs $S_{21}$ to $S_{2m}$ of the first dark pixels $DP_{21}$ to $DP_{2m}$ of the second row DR2 of the first dark area 212 (or the first dark areas 212a and 212b) and the per-column weighted averages $P_{21}$ to $P_{2m}$ of the first row DR1 of the second frame stored in the memory 230, extracts the per-column weighted averages $P_{31}$ to $P_{3m}$ of the second row DR2, and stores the extracted per-column weighted averages $P_{31}$ to $P_{3m}$ of the second row DR2 in the memory 230 in a manner similar or identical to the extracted per-column weighted averages $P_{21}$ to $P_{2m}$ of the first row DR1 of the second frame.

The first average extractor 220 may store the per-column weighted averages $P_{31}$ to $P_{3m}$ of the second row DR2 may be stored in the memory 230 in addition to each of the per-column weighted averages $P_{21}$ to $P_{2m}$ or by overwriting the per-column weighted averages $P_{21}$ to $P_{2m}$, thereby performing a further update.

For example, a larger weighted value may be given to the per-column weighted averages $P_{21}$ to $P_{2m}$ of the first row DR1 of the second frame as compared to the outputs $S_{21}$ to $S_{2m}$ of the first dark pixels of the second row DR2 of the second frame during weighted averaging, or vice versa, although the invention is not limited thereto.

Figure 6D:
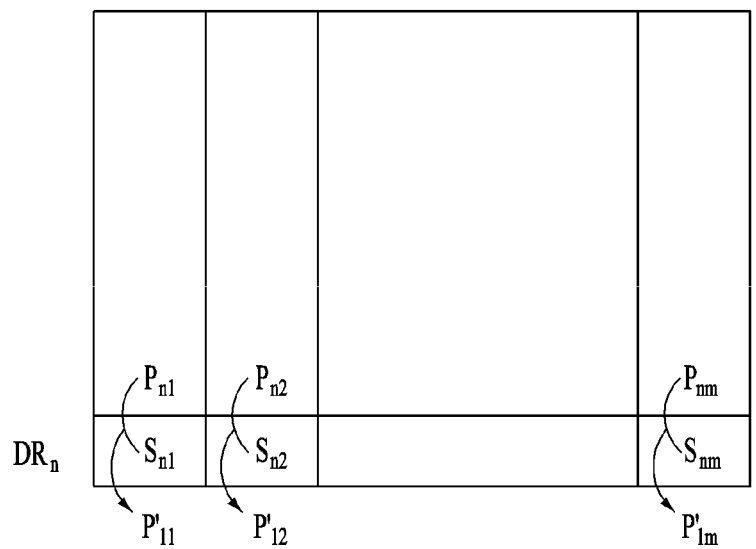

Referring to FIG. 6D, using the same method as FIG. 6C, the remaining per-column weighted averages $P_{n1}$ to $P_{nm}$ of the first dark pixels $DP_{n1}$ to $DP_{nm}$ of each remaining row up to the last row DRn of the second frame may be extracted, and the final extracted per-column weighted averages $P'_{11}$ to $P'_{nm}$ may be stored in the memory 230.

The per-column weighted averages $P'_{11}$ to $P'_{nm}$ of the first dark pixels $DP_{n1}$ to $DP_{nm}$ of following extraction of the per-column weighted averages of the last row DRn may become the per-column dark offset value $S_{C2}$ of the first dark area 212 (or the first dark areas 212a and 212b) of the second frame.

Extracting the per-column averages $P_{11}$ to $P_{1m}$ as described with reference to FIG. 6A may be implemented with and/or performed by a finite impulse response (FIR) filter, and extracting the per-column weighted average described with reference to FIGS. 6B to 6D may be implemented with and/or performed by an infinite impulse response (IIR) filter.

The second average extractor 240 (FIG. 5) extracts an average $S_G$ of all of the first dark pixels in the first dark area 212 (or the first dark areas 212a and 212b) using the output of the first filter 210. For example, the second average extractor 240 may extract the average $S_G$ of all of the first dark pixels in the first dark area 212 (or the first dark areas 212a and 212b) of any one frame from which the outlier(s) are removed by the first filter. Hereinafter, the average $S_G$ output from the second average extractor 240 is referred to as a "global dark offset value".

If the first filter 210 is omitted, the average $S_G$ may be extracted using the first dark pixels.

The selector 250 selects and outputs the per-column dark offset value $S_{C2}$ and the global dark offset value $S_G$ based on or upon the occurrence of one or more predetermined operational conditions.

Here, the predetermined operational conditions may include the illuminance and temperature of the environment surrounding the image sensor.

For example, if the illuminance of the environment surrounding the image sensor is higher than a predetermined threshold illuminance, the selector 250 may select and output the global dark offset value $S_G$, because the sensed signal components in the high-illuminance environment are large, and thus the influence of column fixed pattern noise is low. In this case, since at least the first average extractor 220 may be turned off, it is possible to reduce power consumption in the image sensor.

In addition, when the temperature of the surrounding environment is higher than a predetermined threshold temperature, the variation in dark current is relatively large, and thus the error from the estimated column fixed pattern noise may increase or be relatively large. Therefore, the selector 250 may select and output the global dark offset value $S_G$ when the temperature of the surrounding environment is higher than the predetermined threshold temperature.

In contrast, when the illuminance of the environment surrounding the image sensor does not exceed the threshold illuminance and/or the temperature of the surrounding environment does not exceed the threshold temperature, estimating and removing column fixed pattern noise may be sufficiently accurate and/or useful, and the selector 250 may select and output the per-column dark offset value $S_{C2}$.

In a first offset extractor according to one or more other embodiments, the first filter 210 may be omitted, the first average extractor 220 may extract the average $S_{C2}$ using the output $S_C$ of the first dark pixels instead of the output $S_{C1}$ of the first filter 210, and the second average extractor 240 may extract the global dark offset value $S_G$ using the output $S_C$ of the first dark pixels instead of the output $S_{C1}$ of the first filter 210.

The second offset extractor 502 extracts a per-row average based on an output $S_R$ of the second dark area 222 (or of the second dark areas 222a and 222b) and extracts a per-row noise value from the global dark offset value $S_G$ and the extracted per-row average (e.g., by subtracting the global dark offset value $S_G$ from the extracted per-row average).

The second offset extractor 502 may include a second filter 260, a third average extractor 270 and a calculator or mathematical operator (e.g., a subtractor) 280.

The second filter 260 filters the second dark pixels in each row of the second dark area 222 (or the second dark areas 222a and 222b) to obtain, e.g., a median value of the second dark pixels in each row of the second dark area 222 (or the second dark areas 222a and 222b). For example, the second filter 260 may be or comprise a median filter.

For example, the second filter 260 may select a median (or representative) value from among the second dark pixels in each row (e.g., the two or more second dark pixels adjacent to any one second dark pixel of each row) and output the median (or representative) value $S_{R1}$ of the second dark pixels.

For example, the second filter 260 may select an output (e.g., Y1) of the second dark pixel (e.g., X[1]) of a group of dark pixels or of each row as follows.

For example, the median value (e.g., 2) may be extracted from a second dark pixel (e.g., X[1]) and the outputs (X[1]=1, X[2]=2, X[3]=3) of the next two second dark pixels (e.g., X[2] and X[3]) adjacent thereto, and the extracted median value (e.g., 2) may be changed to the output of the dark pixel (e.g., X[1]). The number of selected adjacent second dark pixels may be two or more. In such a case, the median value is simply a filtered value, in which the value of a first dark pixel represents the value of each of a group of three or more contiguous dark pixels. Alternatively, the value of a second dark pixel (e.g., X[2]) may be compared to the values of the second dark pixels adjacent thereto (e.g., X[1] and X[3], where X[1]=1, X[2]=2 and X[3]=3 for example), and the extracted median value (e.g., 2) may be the median value of the second dark pixels (e.g., X[2]). Such median filtering operations can be performed on a row of second dark pixels or all dark pixels in a dark area (e.g., second dark area 222). Thus, there may be one or more median or representative second dark pixel values for each row of second dark pixels in a second dark area.

The second filter 260 may also remove any outliers from the second dark pixels in each row of the second dark area 222 (or of the second dark areas 222a and 222b) and maintain the average or median (or representative value) of the second dark pixels in each row.

That is, the second filter 260 may serve to cancel random noise in the second dark pixels in each row of the second dark area 222 (or of the second dark areas 222a and 222b).

The third average extractor 270 may extract the per-row average $S_{R2}$ of the second dark pixels in each row of the second dark area 222 (or of the second dark areas 222a and 222b) from the output(s) $S_{R1}$ of the second filter 260.

For example, the outputs $S_R$ of the second dark pixels belonging to each row may be filtered by the second filter 260 to provide the median values $S_{R1}$, and the third average extractor 270 may extract a per-row average $S_{R2}$ of the median values $S_{R1}$ of the second dark pixels in each row. Accordingly, the third average extractor 270 may extract the per-row average $S_{R2}$ corresponding to each of the rows of the second dark area 222 (or of the second dark areas 222a and 222b).

In another embodiment, the second filter 260 may be omitted. If the second filter 260 is omitted, the third average extractor 270 may extract the per-row average $S_{R2}$ using the outputs $S_R$ of the second dark pixels in each row.

The calculator (e.g., subtractor) 280 extracts a per-row noise value (RN) from the global dark offset value $S_G$ and the per-row average $S_{R2}$ (e.g., by subtracting the global dark offset value $S_G$ from the per-row average $S_{R2}$ [RN=$S_{R2}$−$S_G$]).

The calculator 503 outputs a final dark offset value $S_F$ from the per-row noise value RN and the output of the selector 250 (i.e., either $S_{C2}$ or $S_G$).

For example, the calculator 503 may add the output of the selector 250 (i.e., either $S_{C2}$ or $S_G$) to the per-row noise value RN, and output the final dark offset value $S_F$ as the sum of the per-row noise value RN and either $S_{C2}$ or $S_G$.

For example, depending upon the value output from the selector 250 (which may depend on one or more operational conditions of the image sensor, as described herein), the final dark offset value $S_F$ may be a sum of the per-column dark offset value $S_{C2}$ and the per-row noise value RN, or a sum of the global dark offset value $S_G$ and the per-row noise value RN.

For example, if the output of the selector 250 is the global dark offset value $S_G$, the final dark offset value $S_F$ may be the output $S_{R2}$ of the third average extractor 270.

Figure 7A:
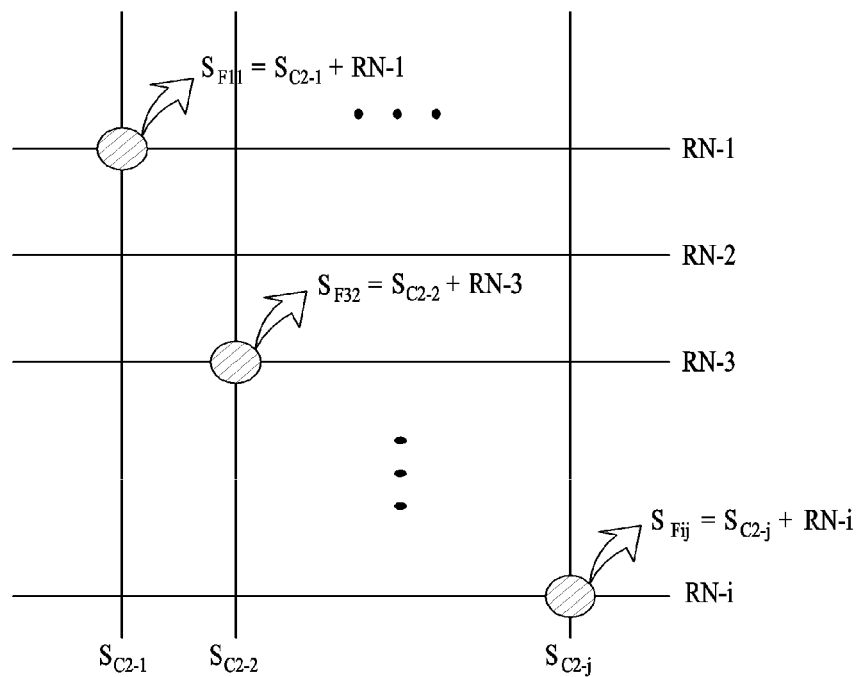
FIG. 7A is a diagram showing an embodiment of extracting a final dark offset value.

FIG. 7A is a diagram showing an embodiment of extracting the final dark offset value $S_F$.

Referring to FIG. 7A, the calculator 503 may add the per-column dark offset values $S_{C2\text{-}1}$ to $S_{C2\text{-}j}$ (j being a natural number greater than 1) of the second dark area 222 (or of the second dark areas 222a and 222b) corresponding to the column of the active pixel area 205 to the per-row noise values RN-1 to RN-i (i being a natural number greater than 1) corresponding to the row of the active pixel area 205, and output the final dark offset values $S_{F11}$ to $S_{Fij}$ corresponding to the column and row of the active pixel area 205 according to the result of the addition operation.

Figure 7B:
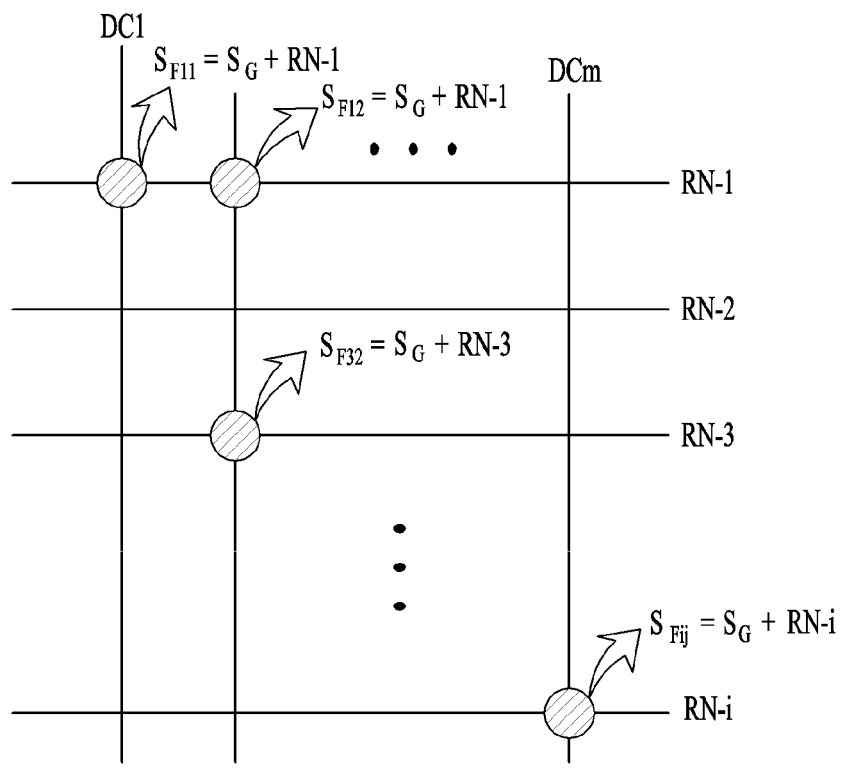
FIG. 7B is a diagram showing another embodiment of extracting the final dark offset value.

FIG. 7B is a diagram showing another embodiment of extracting the final dark offset value $S_F$.

Referring to FIG. 7B, the calculator 503 may add the global dark offset values $S_G$ of the first dark area 212 (or the first dark areas 212a and 212b) to the per-row noise values RN-1 to RN-i (i being a natural number greater than 1) of the second dark area 222 (or of the second dark areas 222a and 222b) corresponding to the row of the active pixel area 205, and output the final dark offset values $S_{F11}$ to $S_{Fij}$ corresponding to the column and row of the active pixel area 205 according to the result of the addition operation. In FIG. 7B, the final dark offset values corresponding to the active cells in each row of the active pixel area 205 may be equal to each other.

The corrector 116 (FIG. 4) corrects the active raw data values of the active pixels in the active pixel area 205 based on the final dark offset value $S_F$, and outputs corrected pixel data values $S_M$.

For example, the corrector 116 may output the corrected pixel data values $S_M$ by applying the final dark offset value $S_F$ to the active raw data values $S\_{raw}$ of the active pixels (e.g., by subtracting the final dark offset value $S_F$ from the active raw data value $S\_{raw}$ of the active pixels in the active pixel area 205).

Figure 8:
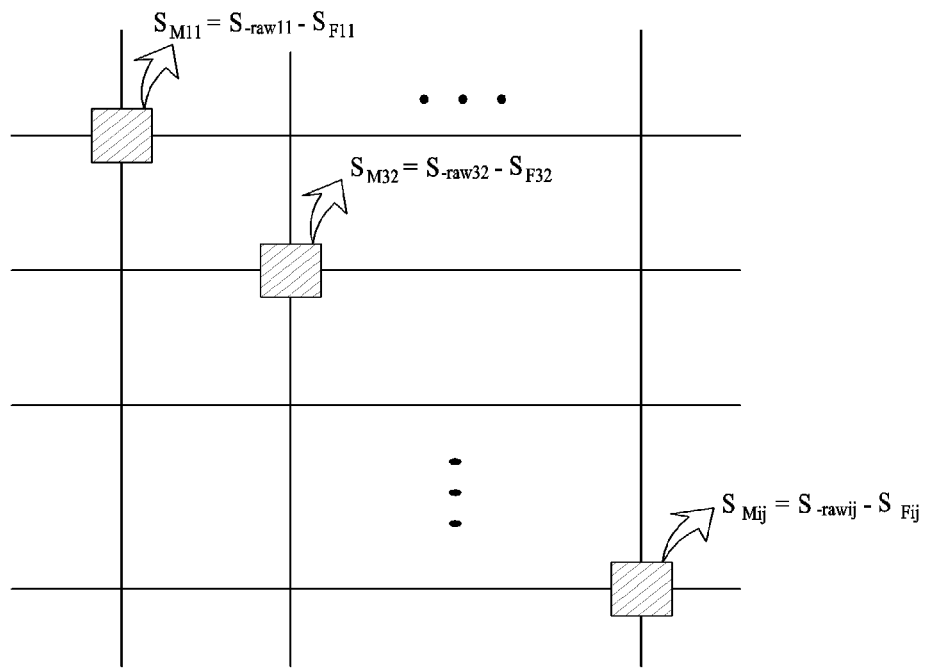
FIG. 8 is a diagram showing one or more embodiments of extracting corrected pixel data values of or from an active pixel area.

FIG. 8 is a diagram showing an embodiment of extracting corrected pixel data values $S_M$ of an active pixel area 205.

Referring to FIG. 8, the corrected pixel data values $S_{Mij}$ of each of the active pixels in the active pixel area 205 may be obtained by subtracting the final dark offset values $S_{F11}$ to $S_{Fij}$ from the active raw data values $S\_{raw11}$ to $S\_{rawij}$ (i and j being natural numbers greater than 1) of the active pixels in the active pixel area 205.

In FIGS. 7A, 7B and 8, the column lines correspond to the columns of the active pixel area 205, and the row lines may correspond to the rows of the active pixel area 205.

In general, when the image sensor is driven with a low voltage (e.g., a low-voltage power supply, such as 5 v, 3.3 V, 2.5 V, 1.8 V, etc., for low-power implementation), the column fixed pattern noise and/or one or more row noise components may be magnified, and image quality may deteriorate. In particular, in a vision sensor, the recognition rate performance may deteriorate.

The final dark offset value $S_F$ including the influence of the column fixed pattern noise and/or row noise is extracted, and the active raw data values of the active pixel area 205 are corrected using the final dark offset value $S_F$, without being influenced by defects that may be present in the first and second dark areas. Accordingly, according to various embodiments, it is possible to simultaneously cancel column fixed pattern noise and row noise, to reduce or prevent image quality deterioration and to reduce or prevent recognition rate performance deterioration in a vision sensor.

In addition, by adjusting the final dark offset value according to operational conditions such as the temperature or illuminance of or in the surrounding environment, it is possible to reduce power consumption and to increase accuracy in correcting the active raw data values of the active pixel area 205 to cancel noise.

In FIG. 5, one of the per-column dark offset value $S_{C2}$ and the global dark offset value $S_G$ may be selected based on or according to one or more operational conditions such as the temperature and/or illuminance of the surrounding environment, thereby determining or influencing the final dark offset value $S_F$.

In other embodiments, the per-row noise value RN may not be applied to the final dark offset value $S_F$ depending on operational conditions such as the temperature or illuminance in the surrounding environment.

For example, when the illuminance of the environment surrounding the image sensor is equal to or greater than a predetermined and/or threshold illuminance, since the influence of per-row noise may be low, the per-row noise value RN may not be extracted, and only the per-column dark offset value $S_{C2}$ or the global dark offset value $S_G$ may be applied, in which case the final dark offset value $S_F$ may be the per-column dark offset value $S_{C2}$ or the global dark offset value $S_G$. In this case, since the second offset extractor 502 may be turned off, it is possible to reduce power consumption.

In addition, for example, when the temperature of the surrounding environment is greater than a predetermined and/or threshold temperature, since the difference between the per-row noise value and the original per-row noise may increase due to a large change in the dark current, the per-row noise value RN may not be extracted, and only the per-column dark offset value $S_{C2}$ or the global dark offset value $S_G$ may be applied, in which case the final dark offset value $S_F$ may be the per-column dark offset value $S_{C2}$ or the global dark offset value $S_G$.

In a further example, as described above, when the surrounding environment has a high luminance and/or a high temperature, at least one of the per-column dark offset value $S_{C2}$ or the per-row noise value RN may not be extracted. Therefore, it is possible to reduce power consumption and to reduce or prevent errors in the final dark offset value $S_F$ depending on the surrounding environmental conditions. For example, the second offset extractor 502 and/or the first average extractor 220 may be turned on or off based on or according to the predetermined operational condition(s), and the per-column dark offset value $S_{C2}$ or the per-row noise value RN may be selectively applied to the final dark offset value $S_F$.

Figure 9:
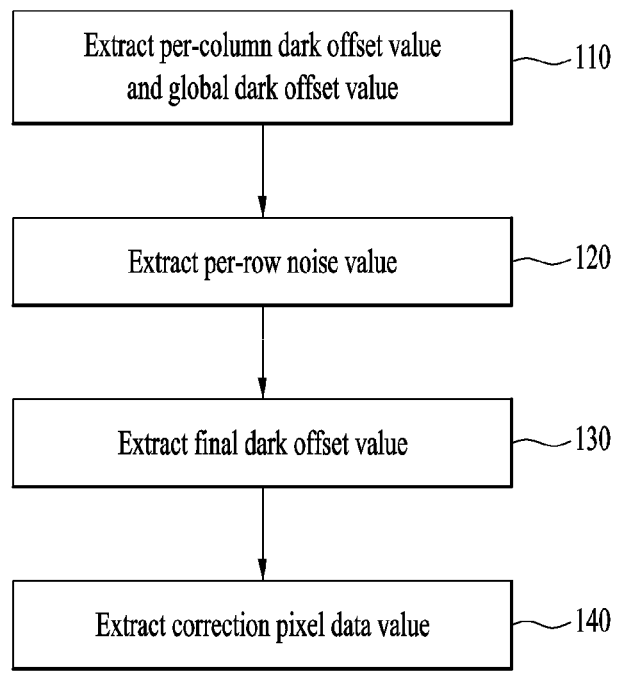
FIG. 9 is a flowchart illustrating a method of sensing an image sensor according to one or more embodiments of the present invention.

FIG. 9 is a flowchart illustrating a method of sensing an image sensor according to one or more embodiments of the present invention.

Referring to FIG. 9, the first dark pixels of the first dark area 212 (or the first dark areas 212a and 212b) are driven by the controller 110, and the per-column dark offset value $S_{C2}$ and the global dark offset value $S_G$ are extracted using the outputs from the driven first dark pixels (5110). For example, the first dark pixels may be analog data values converted by the analog-to-digital conversion unit to digital values in correspondence with the first dark pixels shown in FIG. 1, and the digital values are subsequently transmitted from the memory 140 to the digital signal processor 160.

For example, the outputs $S_C$ of the first dark pixels of the first dark area 212 (or the first dark areas 212a and 212b) may be filtered by the first filter 210, and the per-column dark offset value $S_{Cn}$ may be extracted from the per-column average of the outputs $S_C$ as filtered by the first average extractor 220.

In addition, the global dark offset value $S_G$ may be extracted from the average of all of the outputs $S_C$ of the first dark pixels in the first dark area 212 (or the first dark areas 212a and 212b) by the first filter 210.

Based on or according to operational conditions such as illuminance or temperature, one of the per-column dark offset value $S_{C2}$ or the global dark offset value $S_G$ is selected.

Next, after driving the dark pixels in the first dark area, the second dark pixels in the second dark area 222 (or in the second dark areas 222a and 222b) are driven by the controller 110, and the per-row noise value RN is extracted using the outputs from the driven second dark pixels (S120). For example, the second dark pixels may be analog data values converted by the analog-to-digital conversion unit to digital values in correspondence with the second dark pixels shown in FIG. 1, and the digital values are subsequently transmitted from the memory 140 to the digital signal processor 160.

For example, the outputs $S_R$ of the second dark pixels may be filtered by the second filter 260 (e.g., to provide a median second dark pixel value), the per-row average $S_{R2}$ of the filtered outputs $S_{R1}$ may be extracted, and the per-row noise value RN may be extracted (e.g., by subtracting the global dark offset value $S_G$ from the extracted per-row average $S_{R2}$).

Descriptions of FIGS. 5 and 6A to 6D can be applied to extraction of the per-column dark offset value $S_C$, the global dark offset value $S_G$, and the per-row noise value RN.

Next, based on one of per-column dark offset value $S_C$ and the global dark offset value $S_G$ and the per-row noise value RN (e.g., the selected one of the values $S_C$ and $S_G$), the final dark offset value $S_F$ is extracted (S130).

For example, based on or according to one or more operational conditions such as illuminance or temperature, a sum of the per-column dark offset value $S_C$ and the per-row noise value RN, or a sum of the global dark offset value $S_G$ and the per-row noise value RN may become the final dark offset value $S_F$.

Descriptions of FIGS. 5, 7A and 7B are equally applicable to extracting the final dark offset value $S_F$.

Next, the active pixels in the active pixel area 205 are driven by the controller 110, the active raw data values $S\_{raw}$ corresponding to the outputs of the active pixels are corrected using the final dark offset value $S_F$, and the corrected pixel data values $S_M$ are extracted (S140).

For example, the outputs of the active pixels may be analog data values converted by the analog-to-digital conversion unit to digital values in correspondence with the second dark pixels shown in FIG. 1, and the digital values are subsequently transmitted from the memory 140 to the digital signal processor 160.

For example, the corrected pixel data value $S_M$ may be obtained by subtracting the final dark offset value $S_F$ from the active raw data values $S\_{raw}$ of the active pixels. Descriptions of FIGS. 5 and 8 are equally applicable to extraction of the corrected pixel data value $S_M$.

Features, structures, effects, and the like as described above in the embodiments are included in at least one embodiment of the present invention and should not be limited to only one embodiment. In addition, the features, structures, effects, and the like described in the respective embodiments may be combined or modified even with respect to the other embodiments by those skilled in the art. Accordingly, contents related to these combinations and modifications should be construed as within the scope of the present invention.

What is claimed is:

1. An image sensor comprising:
a pixel array including an active pixel area including active pixels, a first dark area at one or more sides of the active pixel area in a column direction and including first dark pixels, and a second dark area at one or more sides of the active pixel area in a row direction and including second dark pixels;
an offset extractor configured to extracting a final dark offset value; and
a corrector configured to correcting pixel data values of the active pixels based on the final dark offset value,
wherein the offset extractor extracts a per-column dark offset value, a global dark offset value, a per-row average and a per-row noise value, selects one of the extracted per-column dark offset value and global dark offset value, and extracts the final dark offset value from the per-row noise value and the selected one of the per-column dark offset value and the global dark offset value,
the per-column dark offset value is a per-column average of the first dark pixels in each column of the first dark area, and the global dark offset value is an average of all of the first dark pixels, and
the per-row average is a per-row average of the second dark pixels in each row of the second dark area, and the per-row noise value is obtained from the global dark offset value and the per-row average.

2. The image sensor according to claim 1, wherein the offset extractor includes:
a first offset extractor configured to extract the per-column dark offset value and the global dark offset value and select and output one of the per-column dark offset value and the global dark offset value;
a second offset extractor configured to extract the per-row average, then extract the per-row noise value from the global dark offset value and the per-row average; and
a calculator configured to extract the final dark offset value from an output of the first offset extractor and the per-row noise value.

3. The image sensor according to claim 2, wherein the second offset extractor includes:
a third average extractor configured to extract an average of the second dark pixels in each row of the second dark area and output the per-row average; and
a first calculator configured to output the per-row noise value from the global dark offset value and the per-row average.

4. The image sensor according to claim 3, wherein the second offset extractor further includes a second filter configured to filter the second dark pixels in each row of the second dark area and provide a filtered output to the third average extractor.

5. The image sensor according to claim 1, wherein the first offset extractor includes:
a first average extractor configured to extract and output an average of the first dark pixels in each column of the first dark area as the per-column dark offset value;

a second average extractor configured to extract and output an average of all of the first dark pixels in the first dark area as the global dark offset value; and a selector configured to select and output one of the per-column dark offset value and the global dark offset value.

6. The image sensor according to claim 5, wherein the first offset extractor further includes a first filter configured to remove one or more outliers from the first dark pixels and provide the first dark pixels from which the outlier(s) are removed to the first and second average extractors.

7. The image sensor according to claim 5, wherein the first average extractor extracts the per-column dark offset value from a weighted average of the first dark pixels in each column.

8. The image sensor according to claim 7, wherein the first average extractor extracts the weighted average of the first dark pixels of a (k−1)-th (k being a natural number greater than 1 and less than n) row in each column and the weighted average of the first dark pixels of a k-th row of the first dark pixels.

9. The image sensor according to claim 8, wherein the weighted average of the first dark pixels of the first row is the weighted average of the first dark pixels of a last row of each column.

10. The image sensor according to claim 8, wherein the first average extractor gives a larger weight to the weighted average of the first dark pixels of the (k−1)-th (k being a natural number greater than 1 and less than n) row as compared to the first dark pixels of the k-th row.

11. The image sensor according to claim 8, wherein the first average extractor further includes a memory configured to store the weighted average of the first dark pixels of the (k−1)-th (k being a natural number greater than 1 and less than n) row in each column.

12. The image sensor according to claim 1, wherein the corrector outputs corrected pixel data values from the final dark offset value and the pixel data values of the active pixels.

13. An image sensor comprising:
a pixel array unit including an active pixel area including active pixels, a first dark area at one or more sides of the active pixel area in a column direction and including first dark pixels, and a second dark area at one or more sides of the active pixel area in a row direction and including second dark pixels;
a first average extractor configured to remove one or more outliers from outputs of the first dark pixels and output a per-column dark offset value from an average of the first dark pixels in each column of the first dark area from which the outlier(s) are removed;
a second average extractor configured to output a global dark offset value from an average of all of the first dark pixels in the first dark area from which the outlier(s) are removed;
a selector configured to select and output one of the per-column dark offset value and the global dark offset value;
a row offset extractor configured to extract a per-row average of the second dark pixels in each row of the second dark area and output a per-row noise value from the global dark offset value and the per-row average;

a calculator configured to extract a final dark offset value from an output of the selector and the per-row noise value; and
a corrector configured to output corrected pixel data values from the final dark offset value and the pixel data values of the active pixels.

14. A method of sensing an image sensor including a pixel array unit including an active pixel area including active pixels, a first dark area at one or more sides of the active pixel area in a column direction and including first dark pixels, and a second dark area at one or more sides of the active pixel area in a row direction and including second dark pixels, the method comprising:
extracting an average of the first dark pixels in each column of the first dark area and acquiring a per-column dark offset value;
extracting an average of all of the first dark pixels and acquiring a global dark offset value;
selecting one of the per-column dark offset value and the global dark offset value based on one or more predetermined operational conditions;
acquiring a per-row average from an average of the second dark pixels in each row of the second dark area;
extracting per-row noise from the global dark offset value and the per-row average;
acquiring a final dark offset value from the selected one of the per-column dark offset value and the global dark offset value and the per-row noise value based on the one or more predetermined operational conditions; and
correcting pixel data from the active pixels based on or using the final dark offset value.

15. The method according to claim 14, further comprising removing one or more outliers from the first dark pixels before acquiring the per-column dark offset value and acquiring the global dark offset value,
wherein the per-column dark offset value and the global dark offset value are acquired based on the first dark pixels from which the predetermined outlier(s) are removed.

16. The method according to claim 14, wherein acquiring the per-column dark offset value includes extracting the per-column dark offset value by weight-averaging the first dark pixels in each column of the first dark area.

17. The method according to claim 16, wherein acquiring the per-column dark offset value includes extracting a weighted average of the first dark pixels of a (k−1)-th (k being a natural number greater than 1 and less than n) row in each column and a weighted average of the first dark pixels of a k-th row.

18. The method according to claim 17, wherein the weighted average of the first dark pixels of the first row is a weighted average of the first dark pixels of a last row of each column of a previous frame.

19. The method according to claim 17, comprising giving a larger weighted value to the weighted average of the first dark pixels of the (k−1)-th (k being a natural number greater than 1 and less than n) row as compared to the first dark pixels of the k-th row.

20. The method according to claim 14, further comprising filtering the second dark pixels in each row of the second dark area,
wherein the per-row average is acquired using the filtered second dark pixels.

* * * * *